United States Patent [19]

Roger

[11] 4,029,893

[45] June 14, 1977

[54] DOUBLE-WALL CRYOSTAT HAVING ELECTRICAL CONNECTIONS

[75] Inventor: Michel Robert Roger, Bures sur Yvette, France

[73] Assignee: Societe Anonyme de Telecommunications, France

[22] Filed: Dec. 4, 1974

[21] Appl. No.: 529,388

[30] Foreign Application Priority Data

Dec. 28, 1973 France .......................... 73.46720

[52] U.S. Cl. ..................... 174/15 CA; 174/117 F; 174/151

[51] Int. Cl.² ........................................ H01L 39/00

[58] Field of Search ......... 174/15 CA, 151, 117 F; 62/514 R, 514 A, 55.5, 56

[56] References Cited

UNITED STATES PATENTS 3,764,730   10/1973   Malone et al. ................... 174/151

OTHER PUBLICATIONS

Dupont Bulletin, M–97, Dupont Mylar Polyester Film, June 1970.

*Primary Examiner*—Arthur T. Grimley

[57] ABSTRACT

A double-wall cryostat formed by the interconnection of an inner wall and an outer wall in their upper part, the walls defining therebetween a hermetic enclosure in which there is disposed a detector element connected by an electrical connection to circuits outside said enclosure, wherein the two walls are each provided in their upper part with a flexible sealing element, the two sealing elements cooperating by contact for ensuring the hermetic interconnection of the two walls and the electrical connection, formed by fine conductor wires enclosed between two thin flexible insulating bands, extends out of the hermetic enclosure between said sealing elements.

2 Claims, 3 Drawing Figures

DOUBLE-WALL CRYOSTAT HAVING ELECTRICAL CONNECTIONS

The present invention relates to a double-wall cryostat having electrical connections for in particular maintaining at a suitable temperature of operation a sensing member or detector generally constituted by a semi-conductor material. Cryostats known at the present time for this type of utilization are double-wall vessels which are capable of being disassembled and in which the inner wall, which contains the cryogenic fluid and carries on its outer surface the sensing member, bears through a sealing element against the outer wall which has an optical window allowing an exterior radiation to reach the sensing member. An orifice provided with a valve enables a vacuum to be produced in the space between the two walls and a soldered, adhered or screwed hermetic electical connector comprising one or more insulated conductors is provided for ensuring the electrical connection between the sensing member and circuits outside the cryostat. Different types of hermetic electrical connectors are known for different types of coaxial or double-wire connections. However, when the detector is a multicell member, the hermetic electrical connector soon becomes rapidly cumbersome and may even require an increase in the dimensions of the cryostat to which the connector must be secured.

Further, the operation for fixing the connector to the wall of the cryostat, which is easily carried out by soldering, might affect and even destroy the hermetic quality of the enclosure.

Moreover, hermetic connectors found on the specialized market are the more expensive as the number of conductors increases, whence their very high price when the detector contained in the cryostat is a mosaic of elementary detectors.

The cryostat according to the invention overcomes these drawbacks by avoiding the use of a known hermetic connector.

According to the invention there is provided a double-wall cryostat formed by the interconnection of an inner wall and an outer wall in their upper part, the walls defining therebetween a hermetic enclosure in which there is disposed a sensing member or detector connected by an electrical connection to circuits outside said enclosure, wherein the two walls are each provided in their upper part with a flexible sealing element, the two sealing elements cooperating by contact for ensuring the hermetic interconnection of the two walls and the electrical connection, formed by fine conductor wires enclosed between two thin flexible insulating bands, extends out of the hermetic enclosure between said sealing elements.

The thinness of the flexible band carrying the electrical conductors associated with the high ductility of the flexible sealing elements ensure a perfect covering of the surfaces in contact. Moreover, the high flexibility of the band carrying the electrical conductors allows the assembly of the two walls with sufficient pressure to impart a very good hermetic quality to the cryostat according to the invention.

With the cryostat according to the invention in which the hermetic quality is ensured in the region of the sealing elements, the connectors employed are ordinary non-hermetic connectors. This permits a reduction in the dimensions of the hermetic enclosure, a reduction in the heat losses due to the electrical connections and considerable saving as concerns the price of the connectors employed.

In one embodiment, the flexible sealing elements are made from pure indium. Preferably, the flexible band carrying the electrical connections is a film of polyester on which are deposited in accordance with known methods for printed circuits the required number of electrical conductors. The latter are covered with a thin insulating layer such as a second film of polyester.

Further features and advantages of the cryostat according to the invention will be apparent from the ensuing description with reference to the accompanying drawings in which.

Figure 1:
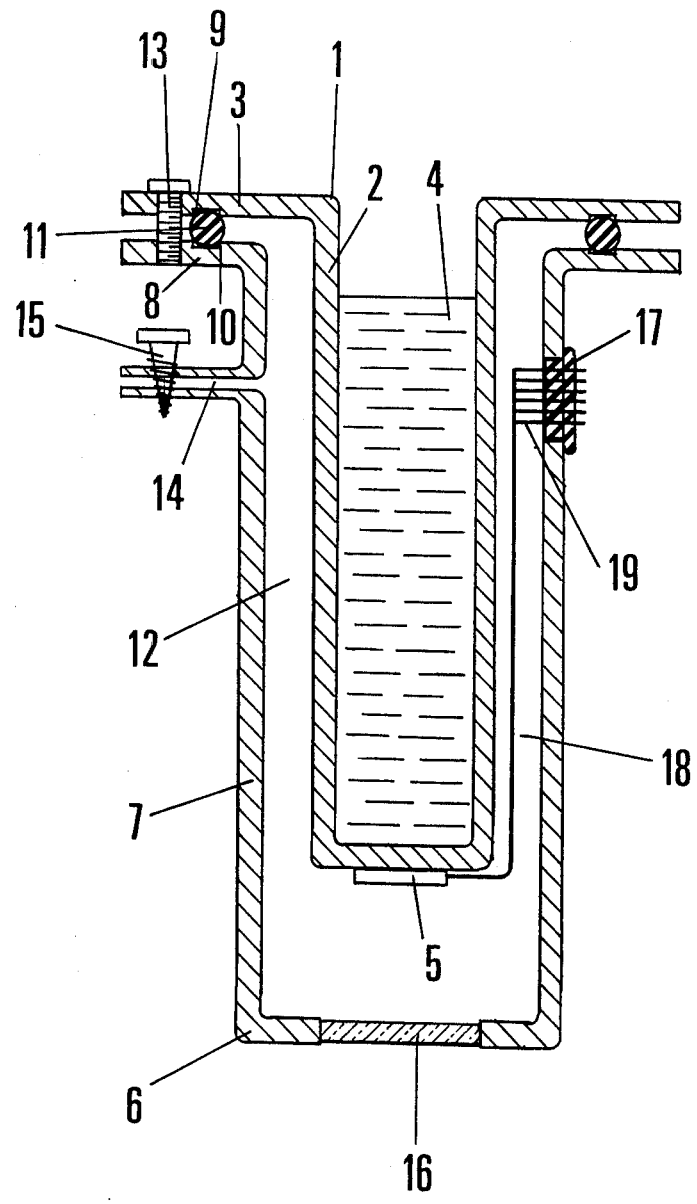
FIG. 1 is a diagrammatic sectional view of an embodiment of a known cryostat.

The inner wall 1 of the cryostat of known type shown in section in a vertical plane in FIG. 1 comprises a cylindrical portion 2 closed at its lower end, and a flange 3 in the form of a ring. This inner wall is adapted to contain the cryogenic liquid 4. An optical detector 5 is secured to this inner wall 1 in an enclosure 12 defined between the inner wall 1 and an outer wall 6 which is composed of a cylindrical portion 7 and an upper flange 8. In the two flanges 3 and 8, confronting grooves 9 and 10 respectively permit interposing an O-ring seal 11 which ensures the hermetic quality of the enclosure 12 when the flanges 3 and 8 are clamped together by screws 13 evenly spaced apart on a diameter of the flanges which is larger than the diameter of the O-ring seal. Further, a pipe 14 closed by a cock 15 enables a vacuum to be produced in the hermetic enclosure 12. A window 16 provided in the outer wall is of a material which is transparent to the wavelengths detected by the detector 5. A multi-pin hermetic connector 17 is soldered to the outer wall and wires 18 connect the detector 5 to the parts of pins 19 located in the enclosure 12. The passage for each pin 19 from the enclosure 12 to the exterior being hermetically sealed, the connector 17 is a costly, space-consuming part which is delicate to handle.

Figure 2:
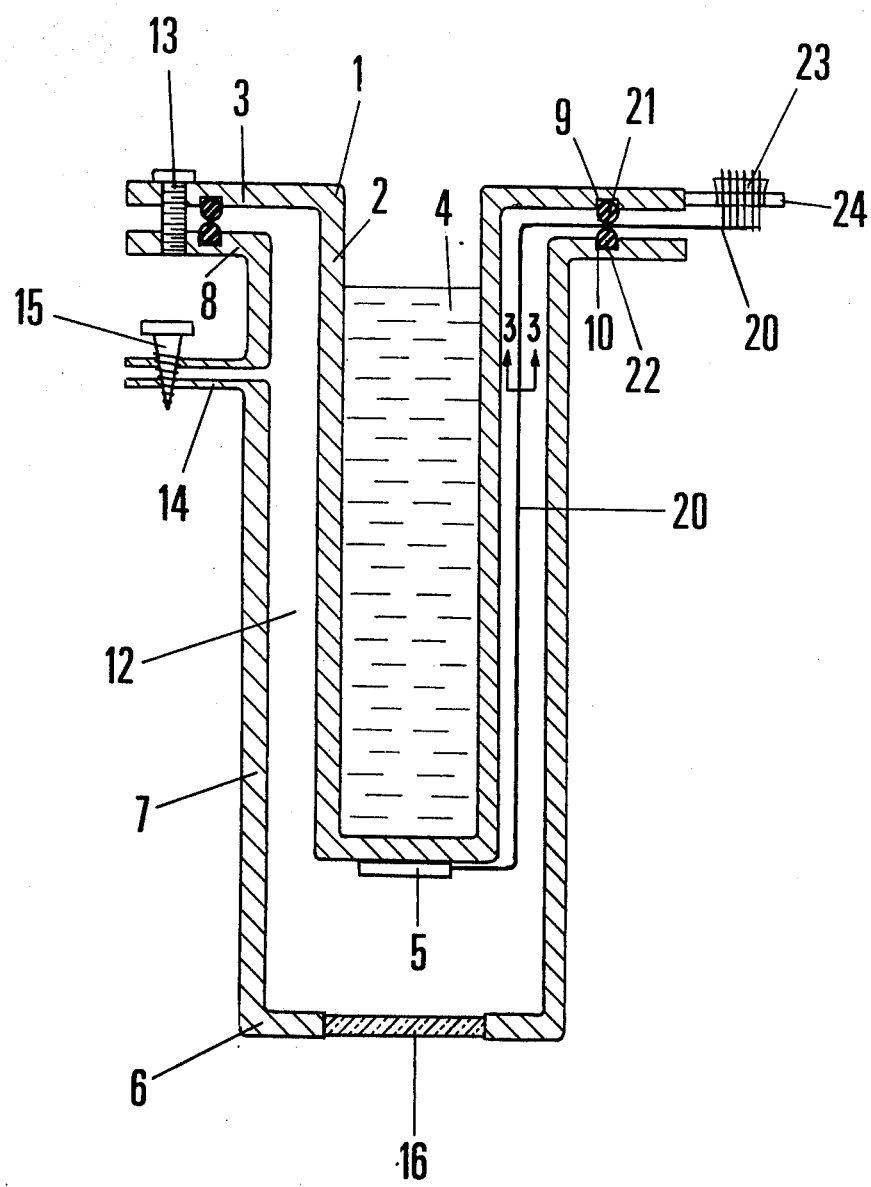
FIG. 2 is a diagrammatic sectional view of an embodiment of a cryostat according to the invention.
Figure 3:
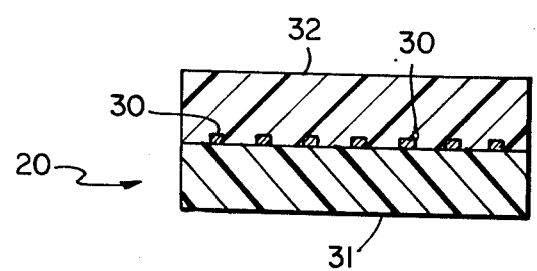
FIG. 3 is a greatly enlarged diagrammatic detail view in section taken along lines 3—3 in FIG. 2.

FIG. 2 shows in section a cryostat according to one embodiment of the invention. In this figure elements identical to those shown in FIG. 1 carry the same reference numerals. In the cryostat according to the invention, the connecting wires are included in a flexible connection band 20 which is connected at one end to the detector 5 and extends out of the hermetic enclosure 12 and is clamped between two flexible metal sealing elements 21 and 22 placed in the grooves 9 and 10 of the flanges 3 and 8. The connection band 20 is connected at its other end to a simple connector 23 which may be, for example, carried by a support 24 secured to the flange 3. The sealing elements 21 and 22 may be advantageously composed of pure indium. The flexible connection band 20 (FIG. 3) is a plurality of fine electrical conductors 30 printed on a polyester band 31 and covered by polyester band 32.

As the hermetic quality of the enclosure 12 is ensured in the region of the flexible metal sealing elements 21 and 22, the connector 23 is simple, cheap and sturdy. Moveover, it the connector 23 is not secured to the hermetic enclosure 12 and places no limit on the choice of the shapes, dimensions and constituent materials of the enclosure.

The cryostat according to the invention advantageously replaces the known cryostats in utilizations in which the electrical connections are achieved between elements located in the hermetic enclosure and circuits located outside the latter.

What I claim is:

1. In a double-wall cryostat formed by the interconnection of an inner wall and an outer wall in their upper part, the walls defining therebetween a hermetic enclosure in which there is disposed a detector element connected by an electrical connector means to circuits outside said enclosure, the improvement which comprises providing each of the two walls in their upper part with a flexible metallic sealing element, the two metallic sealing elements cooperating by contact for ensuring the hermetic interconnection of the two walls and the electrical connector means comprises a plurality of electrical conductors deposited on a thin band of insulating material and covered with a second thin band of insulating material, said electrical conductor means extending locally out of the hermetic enclosure between said sealing elements, the thinness of the electrical connector means and the ductility of the metallic sealing elements cooperating to enable the cryostat to be hermetically sealed even in the region where said electrical connector means passes through said sealing elements.

2. A cryostat as claimed in claim 1, wherein the metal sealing elements are of pure indium.

* * * * *